United States Patent
Lee

(10) Patent No.: US 6,314,893 B1
(45) Date of Patent: Nov. 13, 2001

(54) TABLE FRAME FOR CUTTING MACHINE

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 0 days.

(21) Appl. No.: 09/491,501

(22) Filed: Jan. 26, 2000

(51) Int. Cl.[7] .................................................. A47B 9/00
(52) U.S. Cl. ............................................. 108/119; 83/859
(58) Field of Search ................................ 144/286.1, 267, 144/286.5; 108/269, 117, 118, 29, 128, 131, 119; 83/859, 953, 477

(56) References Cited

U.S. PATENT DOCUMENTS

| | | | | |
|---|---|---|---|---|
| 152,871 | * | 7/1874 | Shallus | 108/119 |
| 1,743,972 | * | 1/1930 | Krummes | 108/119 |
| 1,941,333 | * | 12/1933 | Whalley et al. | 108/119 |
| 1,975,857 | * | 10/1934 | McKenney | 108/119 |
| 3,017,034 | * | 1/1962 | Klein | 108/119 |
| 4,262,606 | * | 4/1981 | Hodson | 108/111 |
| 4,760,801 | * | 8/1988 | Campbell | 108/116 |
| 4,904,018 | * | 2/1990 | Young | 108/116 |
| 5,320,150 | * | 6/1994 | Everts et al. | 144/269 |
| 5,509,360 | * | 4/1996 | Chin | 108/119 |
| 5,542,359 | * | 8/1996 | Polries | 108/26 |
| 5,542,639 | * | 8/1996 | Wixey et al. | 248/439 |
| 5,584,254 | * | 12/1996 | Williams | 108/118 |
| 5,884,681 | * | 3/1999 | Nickles | 114/329 |

* cited by examiner

*Primary Examiner*—M. Rachuba
*Assistant Examiner*—Omar Flores-Sánchez
(74) *Attorney, Agent, or Firm*—Raymond Y. Chan; David and Raymond Patent Group

(57) ABSTRACT

A table frame for supporting cutting machine includes a foldable support frame and a tabletop frame having a connecting end portion pivotally connected with a top side of the foldable support frame. The foldable support frame includes two opposing pairs of leg frames each of which comprises a pair of first and second crossed legs pivotally connected together where the first and second crossed legs cross, and a stopper means for supporting between the first and second crossed legs of each of the two leg frames and limiting the inclination of each of the first and second crossed legs. Thereby, by pivotally rotating the connecting end portion, the tabletop frame can be lifted up to horizontally rest across the supporting bar or be dropped down to vertically overlap with the folded support frame. Accordingly, the table frame can be easily folded for storage and carriage and unfolded for supporting the cutting machine or other similar machines.

12 Claims, 5 Drawing Sheets

TABLE FRAME FOR CUTTING MACHINE

BACKGROUND OF THE PRESENT INVENTION

1. Field of Invention

The present invention relates to table frame, and more particularly to a foldable table frame for cutting machine, which can be quickly and easily folded for carriage and storage and unfolded for supporting the cutting machine.

2. Description of Related Arts

Referring to FIG. 1 of the drawing, a conventional cutting machine is illustrated, that is commonly used in the construction industry for shaping and cutting materials such as ceramic tile, marble, cranite, and natural stone. The conventional cutting machine comprises a cutting table 11 supported on a supporting frame 12, four construction posts 121 positioned at four corners of the supporting frame 12, a cutting head 13 overhanging the cutting table 11 with a circular saw blade 14 which is powered by an electric motor 15. The electric motor 15 is directly mounted on the cutting head 13 for driving the saw blade 14 to rotate through a transmission means 16.

Accordingly, the conventional cutting machine further comprises a floor standing frame 17 which comprises a set of four standing legs 171 detachably connected with the four construction posts 121 respectively by a connecting bolt 172 for supporting the cutting machine on a floor. During transportation or storage, a user may detach the four standing legs 171 by pulling them out from four construction posts 121 after unscrewing the connecting bolts 172.

However, the conventional floor standing frame for supporting the cutting machine includes the following drawbacks:

1. The cutting head comprising a motor and a transmission means is positioned above the supporting frame and the floor standing frame must support the heavy weight of the cutting head. In fact, the four-leg structure of the floor standing frame is weak structure to support the heaving weight. Therefore, the four standing legs of the floor standing frame must be made of strong material such as cast iron or steel alloy can be securely fastened to the four construction posts in order to rigidly support the heavy cutting head.

2. The floor standing frame requires assembly or disassembly to use or store. The floor standing frame is detachably attached on the supporting by means of the four standing legs can be detached from the four construction posts of the supporting frame respectively. So, the user must assemble the floor standing frame when the cutting machine is needed to be used and disassemble the four standing legs from the supporting frame after using the cutting machine.

3. The floor standing frame which is constructed by several parts includes four standing legs and several connecting bolts. When the floor standing frame is disassembled for transportation or storage, the user must carry or store all the several parts of the floor standing frame because it is easy to loss one of the parts.

4. When the floor standing frame is assembled for use, the user must need a tool to attach the floor standing frame to the supporting frame so as to connect the standing legs to the construction posts by screwing the connecting bolts. Likewise, the user must use a tool to unscrew the connecting bolts in order to detach the standing legs from the construction posts when disassembling the floor standing frame.

SUMMARY OF THE PRESENT INVENTION

A main object of the present invention is to provide a table frame for supporting a cutting machine, which can be easily folded for storage and carriage and unfolded for supporting the cutting machine or other similar machines.

Another object of the present invention is to provide a table frame for cutting machine that does not require assembly or disassembly to use or store.

Another object of the present invention is to provide table frame which not only provides adequate support for cutting machine but also provides an additional work table for objects to be or after shaped and cut.

Another object of the present invention is to provide table frame that can be used in any location without using tools for its assembly or disassembly.

Another object of the present invention is to provide table frame that can be easily carried with one hand and transported in any vehicle.

Accordingly, in order to accomplish the above objects, the present invention provides a table frame for cutting machine, which comprises a foldable support frame and a tabletop frame.

The foldable support frame comprises:

- two opposing pairs of leg frames each of which comprises a pair of first and second crossed legs pivotally connected together where the first and second crossed legs cross,
- a first connection means for supporting the two first crossed legs in parallel manner,
- a second connection means for supporting the two second crossed legs in parallel manner,
- a supporting bar affixedly connected between two top ends of the two first crossed legs, and
- a stopper means for supporting between the first and second crossed legs of each of the two leg frames and limiting the inclination of each of the first and second crossed legs, so that the foldable support frame is able to be unfolded to a set-up structure in which each of the leg frames can be unfolded to form a rigid "X" structure to support the tabletop frame thereon, or be folded up to an overlapping structure.

The tabletop frame comprises:

a hinge bar, a pair of parallel table arms each having one end perpendicularly connected to two ends of the hinge bar to form a connecting end portion of the tabletop frame which is pivotally connected between two top ends of the two second crossed legs, wherein each of the two table arms is extended from the hinge bar to form a tabletop portion and a tail portion, each of the tabletop portions of the two table arms having a length equal to a distance between the top ends of the first and second crossed legs and supporting between the hinge bar and the supporting bar, the two tail portions of the two table arms respectively extending outwardly from the supporting bar when the table frame is unfolded to the set-up structure, and a table board affixed between the two tail portions of the two table arms, thereby, by pivotally rotating the connecting end portion, the tabletop frame can be lifted up to horizontally rest across the supporting bar or be dropped down to vertically overlap with the folded support frame.

DETAILED DESCRIPTION OF THE PREFERRED EMBODIMENT

Figure 1:
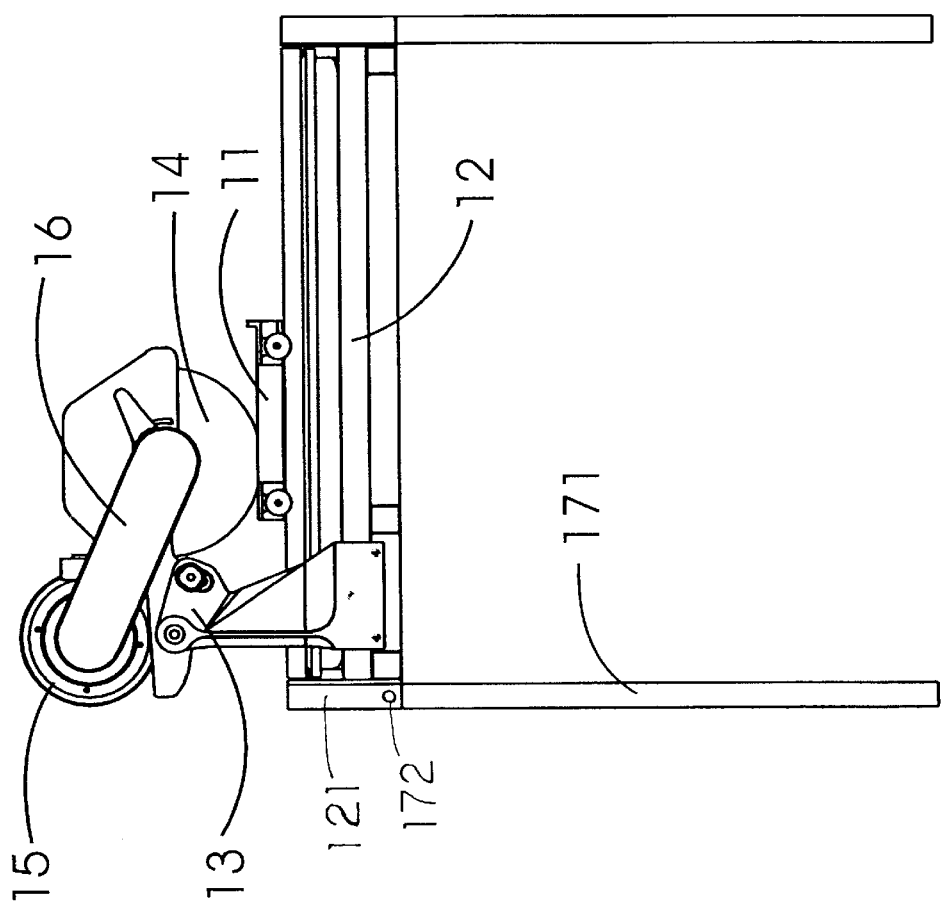
FIG. 1 is a front view of a conventional table frame for cutting machine.

Referring to FIGS. 2 to 5 of the drawings, a table frame 2 for supporting a cutting machine 5 according to a preferred embodiment of the present invention is illustrated, which comprises a foldable support frame 3 and a tabletop frame 4.

The foldable support frame 3 comprises two opposing pairs of leg frames 30 each of which comprises a pair of first and second crossed legs 31, 32 pivotally connected together where the first and second crossed legs 31, 32 cross.

Figure 2:
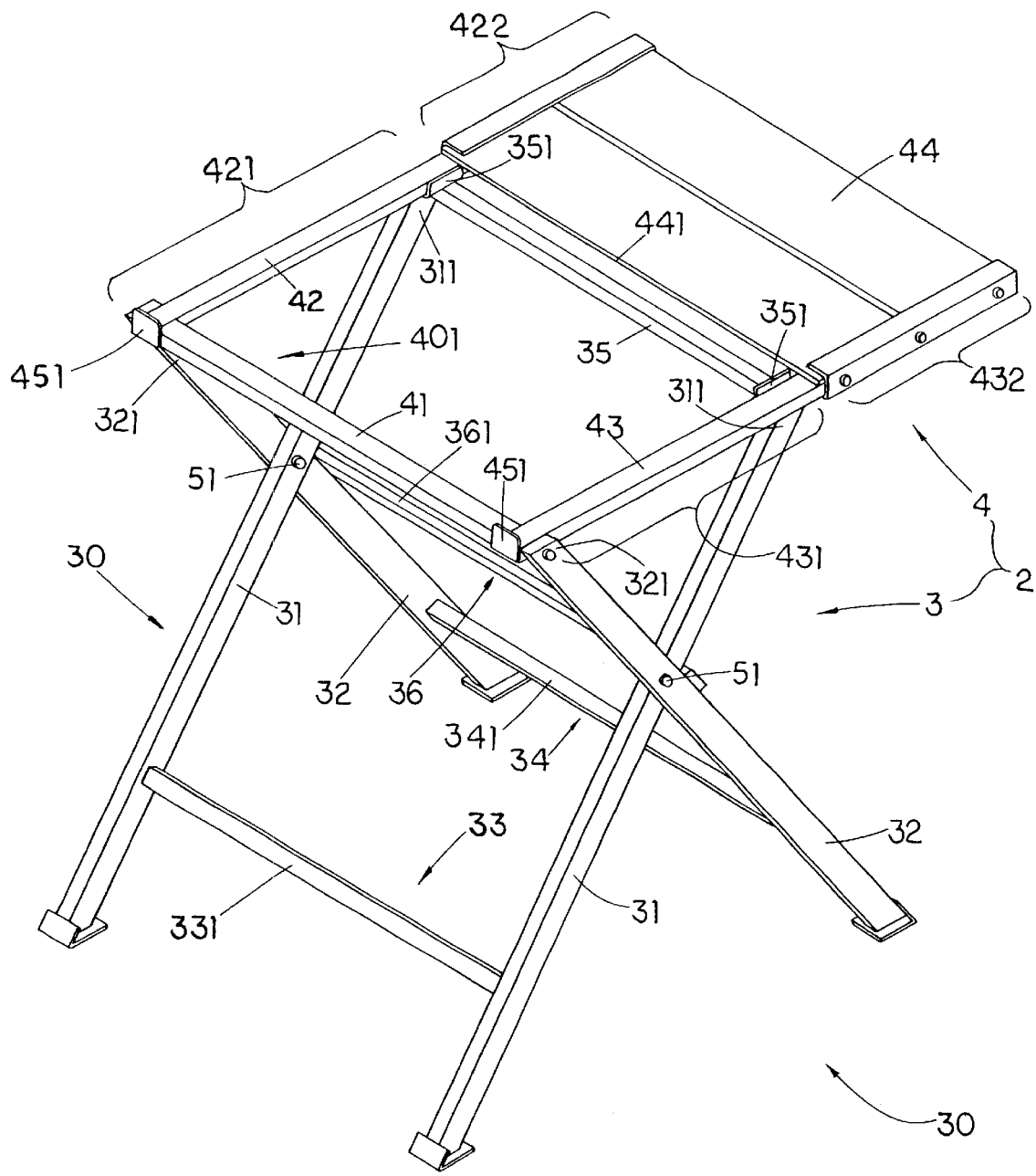
FIG. 2 is a perspective view of the set-up structure of a table frame for cutting machine according to a preferred embodiment of the present invention.
Figure 4:
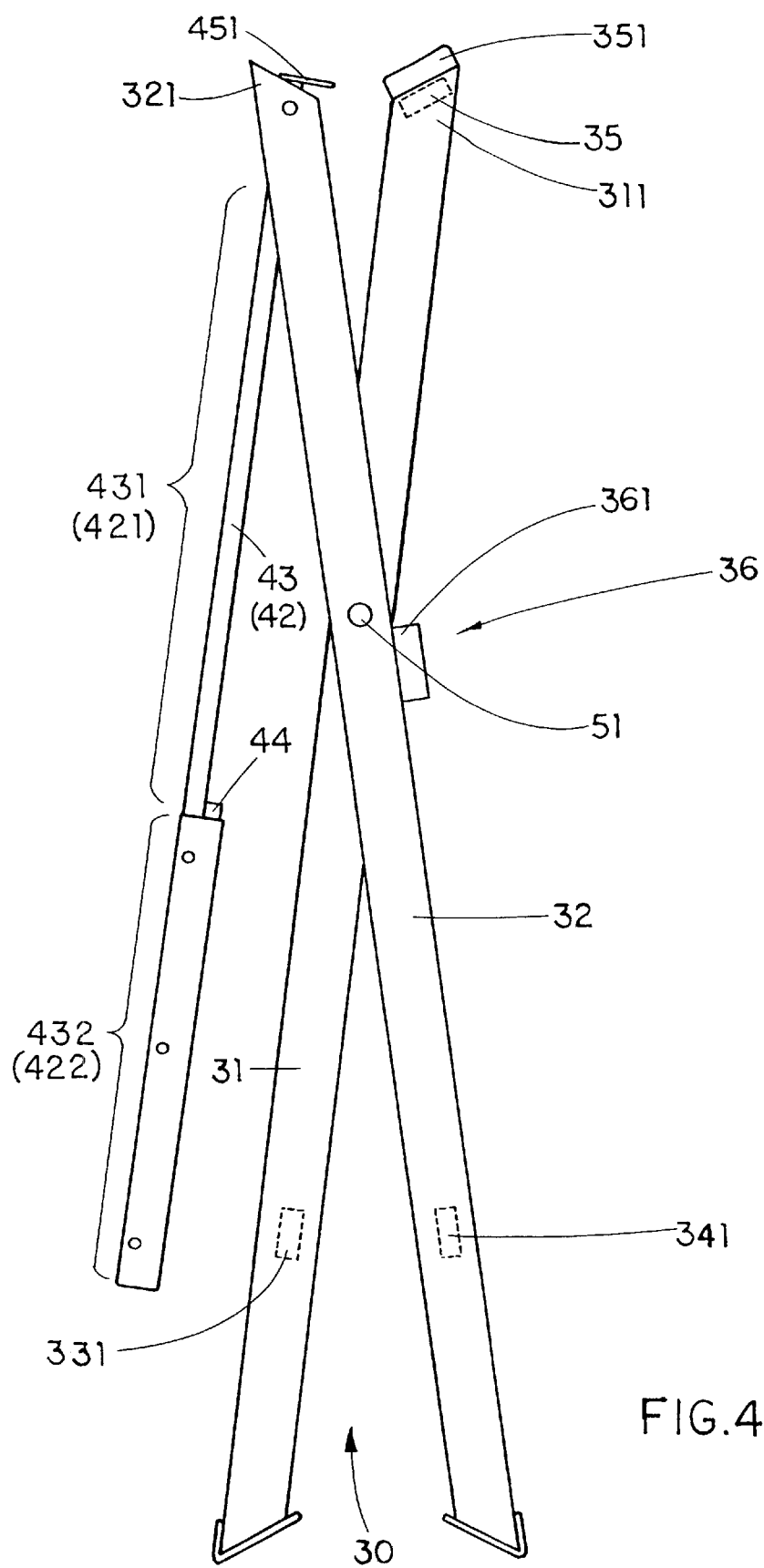
FIG. 4 is a perspective view of the overlapping structure of the table frame for cutting machine according to the above preferred embodiment of the present invention.

The foldable support frame 3 further comprises a first connection means 33 for supporting the two first crossed legs 31 in parallel manner, a second connection means 34 for supporting the two second crossed legs 32 in parallel manner, a supporting bar 35 affixedly connected between two top ends 311 of the two first crossed legs 31, and a stopper means 36 for supporting between the first and second crossed legs 31, 32 of each of the two leg frames 30 and limiting the inclination of each of the first and second crossed legs 31, 32, so that the foldable support frame 3 is able to be unfolded to a set-up structure in which each of the leg frames 30 can be unfolded to form a rigid "X" structure to support the tabletop frame 4 thereon (as shown in FIG. 2), or be folded up to an overlapping structure (as shown in FIG. 4).

The tabletop frame 4 comprises a hinge bar 41, a pair of parallel table arms 42, 43, and a table board 44. Each of the table arms 42, 43 has one end perpendicularly connected to two ends of the hinge bar 41 to form a connecting end portion 401 of the tabletop frame 4 which is pivotally connected between two top ends 321 of the two second crossed legs 32.

Each of the two table arms 42, 43 is extended from the hinge bar 41 to form a tabletop portion 421, 431 and a tail portion 422, 432, each of the tabletop portions 421, 431 of the two table arms 42, 43 having a length equal to a distance between the top ends 311, 321 of the first and second crossed legs 31, 32 and supporting between the hinge bar 41 and the supporting bar 35, the two tail portions 422, 432 of the two table arms 42, 43 respectively extending outwardly from the supporting bar 35 when the table frame 2 is unfolded to the set-up structure.

The table board 44 is affixed between the two tail portions 422, 432 of the two table arms 42, 43. Thereby, by pivotally rotating the connecting end portion 401, the tabletop frame 4 can be lifted up to horizontally rest across the supporting bar 35, as shown in FIG. 2, or be dropped down to vertically overlap with the folded support frame 3, as shown in FIG. 4.

According to the preferred embodiment of the present invention, the first connection means 33 comprises a connection bar 331 perpendicularly and integrally connected between the lower portions of the two first crossed legs 31 of the two leg frames 30 by welding so as to firmly support the two first crossed legs 31 parallelly. The second connection means 34 comprises a connection bar 341 perpendicularly and integrally connected between the lower portions of the two second crossed legs 32 of the two leg frames 30 by welding so as to firmly support the two second crossed legs 32 in parallel manner.

Each of the crossed legs 31, 32, the connection bars 33, 34, supporting bar 35, hinge bar 41, and the two table arms 42, 43 has a rectangular cross section and is made of sturdy material such as cast iron or steel alloy.

Two rivets 51 are used to pivotally connect the first and second crossed legs 31, 32 of the two leg frames 30 respectively such that the first and second crossed legs 31, 32 are arranged to be rotated along the rivet 51 in a scissors-like manner.

The stopper means 36 comprises a stopper bar 361 connected between the two second crossed legs 32, wherein two ends of the stopper bar 361 are each respectively affixed on a side of the respective second crossed leg 32 at a position adjacent to where it pivotally connects with the first crossed leg 31 in such a manner that, when the upper portions of the two first crossed legs 31 are swung away from the two second crossed legs 32, the two first crossed legs 31 will be stopped and supported by the stopper bar 361, as shown in FIG. 2, to form the set-up structure. However, the two first crossed legs 31 are free to backwardly swing towards the two second crossed legs 32 respectively until they are folded up to form the overlapping structure as shown in FIG. 4.

In other words, the stopper bar 361 not only can further reinforce the rigid connection between the two second crossed legs 32 as well as the two leg frames 30, but also can limit the inclination of the first and second crossed legs 31, 32 and firmly support the two inclined first crossed legs 31 at the pivotally points of the leg frames 30.

According to the preferred embodiment of the present invention, each of the table arms 42, 43 of the tabletop frame 4 has a length shorter than the height of the table frame 3 when it is folded up to the overlapping structure, so that the tabletop frame 4 is vertically suspended on a side of the folded up support frame 3, as shown in FIG. 4.

A pair of guiders 351 are upwardly projected near two ends of the supporting bar 35 for guiding the two table arms 42, 43 to sit aside thereof so as to avoid unwanted lateral movement of the tabletop frame 4. Furthermore, when a downward force is applied on the tabletop frame 4, which is the weight of a cutting machine 1, the pair of guiders 351 will bias against an inner edge 441 of the table board 44 to further enhance the rigidity of the support frame 3.

As shown in FIG. 2, a pair of holder wings 451 are upwardly projected from two ends of the connecting end portion 401 of the tabletop frame 4 respectively, i.e. the two ends of the two table arms 42, 43, wherein the two holder wings 451 can be used to guide a supporting frame 51 of the cutting machine 5 to place in position on the tabletop frame 4.

Figure 3:
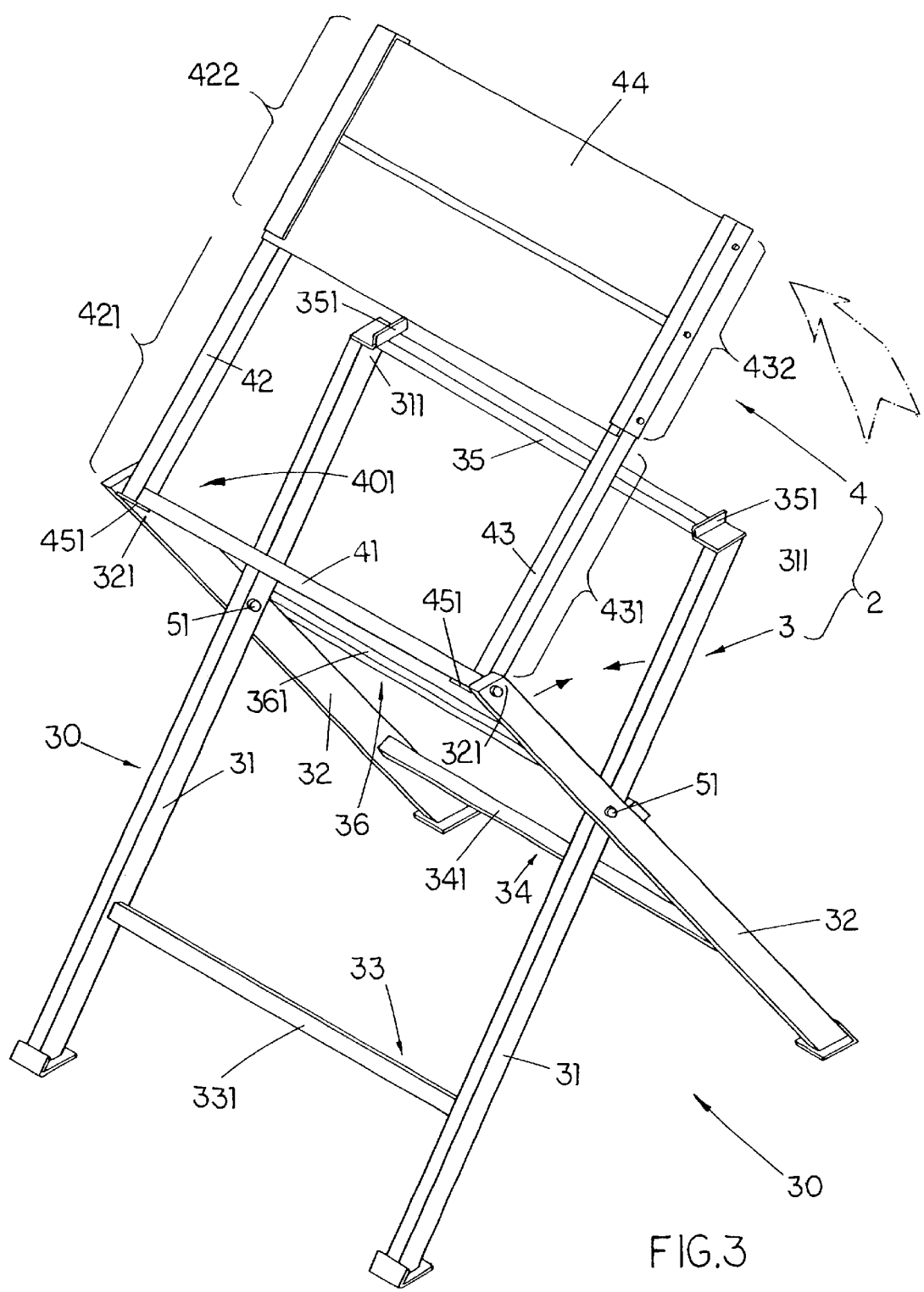
FIG. 3 is a perspective view of the table frame for cutting machine according to the above preferred embodiment of the present invention, illustrating the direction of folding up the table frame.

Referring to FIG. 3, in order to fold up the table frame 2, swing the tabletop frame 4 up about the hinge bar 41 until the tabletop frame 4 is downwardly suspended vertically aside of the support frame 3. Then, by pushing the first and second crossed legs 42, 43 of the two leg frames 30 towards each other, the support frame 3 can be folded up to the overlapping structure as shown in FIG. 4.

During the set-up structure as shown in FIG. 2 of the prevent invention, the table arms 42, 43 are horizontally supported on the opposing pairs of first and second crossed legs 31, 32. A secure structure of rectangular frame is constructed by the two table arms 42, 43, the supporting bar 35 and the hinge bar 41 adapted for supporting the cutting machine 5.

Figure 5:
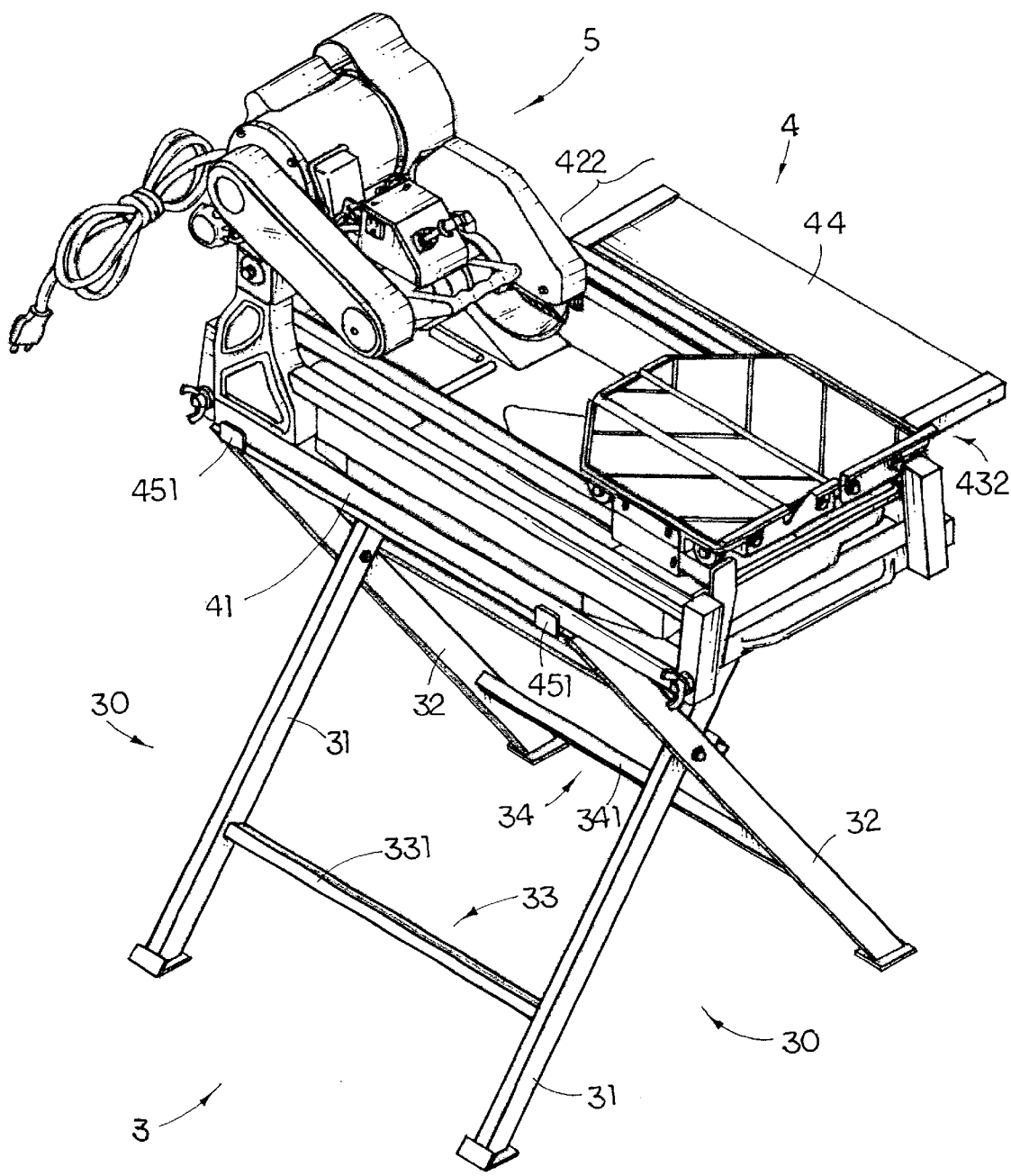
FIG. 5 is a perspective view of a cutting machine supported by the table frame according to the above preferred embodiment of the present invention.

Referring to FIGS. 2 and 5, since the table board 44 is additionally provided extending outwardly from the cutting machine 5 sat on the table frame 2 of the present invention, the table board 44 provides an extra side working surface for the user to put the work pieces to be cut or after cut or accessories thereon for convenience.

Accordingly, the table frame 2 of the present invention meets the needs of portability, ease of use, and sturdiness. The table frame 2 can be set-up and fold-up in one easy motion without using any tools to assemble or disassemble and has a structure that provides strong support for the cutting machine 5. The table frame 2 also prevents the risk of losing parts by having a one-piece structure.

What is claimed is:

1. A table frame for supporting a cutting machine comprising a foldable support frame and a tabletop frame,
    said foldable support frame comprising:
        two opposing pairs of leg frames each of which comprises a pair of first and second crossed legs pivotally connected together where said first and second crossed legs cross;
        a first connection means for supporting said two first crossed legs in parallel manner;
        a second connection means for supporting said two second crossed legs in parallel manner;
        a supporting bar affixedly connected between two top ends of said two first crossed legs; and
        a stopper means for supporting between said first and second crossed legs of each of said two leg frames and limiting an inclination of each of said first and second crossed legs, wherein said foldable support frame is able to selectively be unfolded to a set-up structure in which each of said leg frames is unfolded to form a rigid "X" structure to support said tabletop frame thereon and be folded up to an overlapping structure;
    said tabletop frame comprising:
        a hinge bar;
        a pair of parallel table arms each having one end perpendicularly connected to two ends of said hinge bar to form a connecting end portion of said tabletop frame which is pivotally connected between two top ends of said two second crossed legs, wherein each of said two table arms is extended from said hinge bar to form a tabletop portion and a tail portion, each of said tabletop portions of said two table arms having a length equal to a distance between said top ends of said first and second crossed legs and supporting between said hinge bar and said supporting bar, said two tail portions of said two table arms respectively extending outwardly from said supporting bar when said table frame is unfolded to said set-up structure, wherein a pair of guiders are upwardly projected near two ends of said supporting bar for guiding said two table arms to sit aside thereof so as to hold said tabletop frame in position and prevent lateral movement of said tabletop frame; and
        a table board affixed between said two tail portions of said two table arms;
        thereby, by pivotally rotating said connecting end portion along said hinge bar, said tabletop frame is able to selectively be lifted up to horizontally rest across said supporting bar and be dropped down to vertically overlap with said folded up support frame.

2. The table frame, as recited in claim 1, wherein a pair of holder wings are upwardly projected from two ends of said connecting end portion of said tabletop frame respectively, that is said two ends of said two table arms, wherein said two holder wings are used to guide said cutting machine to place in position on said tabletop frame.

3. A table frame for supporting a cutting machine comprising a foldable support frame and a tabletop frame,
    said foldable support frame comprising:
        two opposing pairs of leg frames each of which comprises a pair of first and second crossed legs pivotally connected together where said first and second crossed legs cross;
        a first connection means for supporting said two first crossed legs in parallel manner;
        a second connection means for supporting said two second crossed legs in parallel manner;
        a supporting bar affixedly connected between two top ends of said two first crossed legs; and
        a stopper means for supporting between said first and second crossed legs of each of said two leg frames and limiting an inclination of each of said first and second crossed legs, wherein said foldable support frame is able to selectively be unfolded to a set-up structure in which each of said leg frames is unfolded to form a rigid "X" structure to support said tabletop frame thereon and be folded up to an overlapping structure, wherein said stopper means comprises a stopper bar connected between said two second crossed legs, wherein two ends of said stopper bar are each respectively affixed on a side of said respective second crossed leg at a position adjacent to where said crossed leg pivotally connects with said first crossed leg in such a manner that, when said upper portions of said two first crossed legs are swung away from said two second crossed legs, said two first crossed legs are stopped and supported by said stopper bar to form said set-up structure;
    said tabletop frame comprising:
        a hinge bar;
        a pair of parallel table arms each having one end perpendicularly connected to two ends of said hinge bar to form a connecting end portion of said tabletop frame which is pivotally connected between two top ends of said two second crossed legs, wherein each of said two table arms is extended from said hinge bar to form a tabletop portion and a tail portion, each of said tabletop portions of said two table arms having a length equal to a distance between said top ends of said first and second crossed legs and supporting between said hinge bar and said supporting bar, said two tail portions of said two table arms respectively extending outwardly from said supporting bar when said table frame is unfolded to said set-up structure, wherein a pair of guiders are upwardly projected near two ends of said supporting bar for guiding said two table arms to sit aside thereof so as to hold said tabletop frame in position and prevent lateral movement of said tabletop frame; and
        a table board affixed between said two tail portions of said two table arms;

thereby, by pivotally rotating said connecting end portion along said hinge bar, said tabletop frame is able to selectively be lifted up to horizontally rest across said supporting bar and be dropped down to vertically overlap with said folded up support frame.

4. The table frame, as recited in claim 3, wherein a pair of holder wings are upwardly projected from two ends of said connecting end portion of said tabletop frame respectively, that is said two ends of said two table arms, wherein said two holder wings are used to guide said cutting machine to place in position on said tabletop frame.

5. The table frame, as recited in claim 3, wherein said first connection means comprises a connection bar perpendicularly integrally connected between said lower portions of said two first crossed legs of said two leg frames to firmly support said two first crossed legs parallelly, and said second connection means comprises a connection bar perpendicularly integrally connected between said lower portions of said two second crossed legs of said two leg frames to firmly support said two second crossed legs in parallel manner.

6. The table frame, as recited in claim 4, wherein said first connection means comprises a connection bar perpendicularly integrally connected between said lower portions of said two first crossed legs of said two leg frames to firmly support said two first crossed legs parallelly, and said second connection means comprises a connection bar perpendicularly integrally connected between said lower portions of said two second crossed legs of said two leg frames to firmly support said two second crossed legs in parallel manner.

7. A table frame for supporting a cutting machine comprising a foldable support frame and a tabletop frame,
   said foldable support frame comprising:
      two opposing pairs of leg frames each of which comprises a pair of first and second crossed legs pivotally connected together where said first and second crossed legs cross;
      a first connection means for supporting said two first crossed legs in parallel manner;
      a second connection means for supporting said two second crossed legs in parallel manner;
      a supporting bar affixedly connected between two top ends of said two first crossed legs; and
      a stopper means for supporting between said first and second crossed legs of each of said two leg frames and limiting an inclination of each of said first and second crossed legs, wherein said foldable support frame is able to selectively be unfolded to a set-up structure in which each of said leg frames is unfolded to form a rigid "X" structure to support said tabletop frame thereon and be folded up to an overlapping structure, wherein said stopper means comprises a stopper bar connected between said two second crossed legs, wherein two ends of said stopper bar are each respectively affixed on a side of said respective second crossed leg at a position adjacent to where said crossed leg pivotally connects with said first crossed leg in such a manner that, when said upper portions of said two first crossed legs are swung away from said two second crossed legs, said two first crossed legs are stopped and supported by said stopper bar to form said set-up structure;
   said tabletop frame comprising:
      a hinge bar;
      a pair of parallel table arms each having one end perpendicularly connected to two ends of said hinge bar to form a connecting end portion of said tabletop frame which is pivotally connected between two top ends of said two second crossed legs, wherein each of said two table arms is extended from said hinge bar to form a tabletop portion and a tail portion, each of said tabletop portions of said two table arms having a length equal to a distance between said top ends of said first and second crossed legs and supporting between said hinge bar and said supporting bar, said two tail portions of said two table arms respectively extending outwardly from said supporting bar when said table frame is unfolded to said set-up structure, wherein each of said table arms of said tabletop frame has a length shorter than said height of said table frame when said foldable support frame folded up to said overlapping structure, so that said tabletop frame is able to vertically suspend on a side of said folded up support frame, wherein a pair of guiders are upwardly projected near two ends of said supporting bar for guiding said two table arms to sit aside thereof so as to hold said tabletop frame in position and prevent lateral movement of said tabletop frame; and
      a table board affixed between said two tail portions of said two table arms;
      thereby, by pivotally rotating said connecting end portion along said hinge bar, said tabletop frame is able to selectively be lifted up to horizontally rest across said supporting bar and be dropped down to vertically overlap with said folded up support frame.

8. The table frame, as recited in claim 7, wherein a pair of holder wings are upwardly projected from two ends of said connecting end portion of said tabletop frame respectively, that is said two ends of said two table arms, wherein said two holder wings are used to guide said cutting machine to place in position on said tabletop frame.

9. The table frame, as recited in claim 7, wherein said first connection means comprises a connection bar perpendicularly integrally connected between said lower portions of said two first crossed legs of said two leg frames to firmly support said two first crossed legs parallelly, and said second connection means comprises a connection bar perpendicularly integrally connected between said lower portions of said two second crossed legs of said two leg frames to firmly support said two second crossed legs in parallel manner.

10. A table frame for supporting a cutting machine comprising a foldable support frame and a tabletop frame,
   said foldable support frame comprising:
      two opposing pairs of leg frames each of which comprises a pair of first and second crossed legs pivotally connected together where said first and second crossed legs cross;
      a first connection means for supporting said two first crossed legs in parallel manner;
      a second connection means for supporting said two second crossed legs in parallel manner;
      a supporting bar affixedly connected between two top ends of said two first crossed legs; and
      a stopper means for supporting between said first and second crossed legs of each of said two leg frames and limiting an inclination of each of said first and second crossed legs, wherein said foldable support frame is able to selectively be unfolded to a set-up structure in which each of said leg frames is unfolded to form a rigid "X" structure to support said tabletop frame thereon and be folded up to an overlapping structure;

said tabletop frame comprising:
  a hinge bar;
  a pair of parallel table arms each having one end perpendicularly connected to two ends of said hinge bar to form a connecting end portion of said tabletop frame which is pivotally connected between two top ends of said two second crossed legs, wherein each of said two table arms is extended from said hinge bar to form a tabletop portion and a tail portion, each of said tabletop portions of said two table arms having a length equal to a distance between said top ends of said first and second crossed legs and supporting between said hinge bar and said supporting bar, said two tail portions of said two table arms respectively extending outwardly from said supporting bar when said table frame is unfolded to said set-up structure;
  a pair of holder wings upwardly projected from two ends of said connecting end portion of said tabletop frame respectively, that is said two ends of said two table arms, wherein said two holder wings are used to guide said cutting machine to place in position on said tabletop frame; and
  a table board affixed between said two tail portions of said two table arms;
  thereby, by pivotally rotating said connecting end portion along said hinge bar, said tabletop frame is able to selectively be lifted up to horizontally rest across said supporting bar and be dropped down to vertically overlap with said folded up support frame.

11. A table frame for supporting a cutting machine comprising a foldable support frame and a tabletop frame,
  said foldable support frame comprising:
    two opposing pairs of leg frames each of which comprises a pair of first and second crossed legs pivotally connected together where said first and second crossed legs cross;
    a first connection means for supporting said two first crossed legs in parallel manner;
    a second connection means for supporting said two second crossed legs in parallel manner;
    a supporting bar affixedly connected between two top ends of said two first crossed legs; and
    a stopper means for supporting between said first and second crossed legs of each of said two leg frames and limiting an inclination of each of said first and second crossed legs, wherein said foldable support frame is able to selectively be unfolded to a set-up structure in which each of said leg frames is unfolded to form a rigid "X" structure to support said tabletop frame thereon and be folded up to an overlapping structure, wherein said stopper means comprises a stopper bar connected between said two second crossed legs, wherein two ends of said stopper bar are each respectively affixed on a side of said respective second crossed leg at a position adjacent to where said crossed leg pivotally connects with said first crossed leg in such a manner that, when said upper portions of said two first crossed legs are swung away from said two second crossed legs, said two first crossed legs are stopped and supported by said stopper bar to form said set-up structure;
  said tabletop frame comprising:
    a hinge bar;
    a pair of parallel table arms each having one end perpendicularly connected to two ends of said hinge bar to form a connecting end portion of said tabletop frame which is pivotally connected between two top ends of said two second crossed legs, wherein each of said two table arms is extended from said hinge bar to form a tabletop portion and a tail portion, each of said tabletop portions of said two table arms having a length equal to a distance between said top ends of said first and second crossed legs and supporting between said hinge bar and said supporting bar, said two tail portions of said two table arms respectively extending outwardly from said supporting bar when said table frame is unfolded to said set-up structure;
    a pair of holder wings upwardly projected from two ends of said connecting end portion of said tabletop frame respectively, that is said two ends of said two table arms, wherein said two holder wings are used to guide said cutting machine to place in position on said tabletop frame; and
    a table board affixed between said two tail portions of said two table arms;
    thereby, by pivotally rotating said connecting end portion along said hinge bar, said tabletop frame is able to selectively be lifted up to horizontally rest across said supporting bar and be dropped down to vertically overlap with said folded up support frame.

12. The table frame, as recited in claim 11, wherein said first connection means comprises a connection bar perpendicularly integrally connected between said lower portions of said two first crossed legs of said two leg frames to firmly support said two first crossed legs parallelly, and said second connection means comprises a connection bar perpendicularly integrally connected between said lower portions of said two second crossed legs of said two leg frames to firmly support said two second crossed legs in parallel manner.

* * * * *